United States Patent [19]

Biggs et al.

[11] 4,311,547

[45] Jan. 19, 1982

[54] METHOD OF MAKING REINFORCED TUBULAR ARTICLES

[75] Inventors: Ian Biggs, Sutton Coldfield; Ronald S. Goy, Tamworth; Kenneth E. Whitehead, Newcastle-upon-Tyne, all of England

[73] Assignee: Dunlop Limited, London, England

[21] Appl. No.: 163,588

[22] Filed: Jun. 27, 1980

Related U.S. Application Data

[63] Continuation of Ser. No. 942,038, Sep. 13, 1978, abandoned.

[30] Foreign Application Priority Data

Sep. 21, 1977 [GB] United Kingdom ............... 39268/77

[51] Int. Cl.³ .............................................. B29D 23/05
[52] U.S. Cl. ............................. 156/244.13; 138/126; 156/149; 264/236; 264/347
[58] Field of Search ................... 156/143, 149, 244.13; 138/123, 124, 125, 126, 141, 145, 146; 264/236, 347, DIG. 51; 428/395, 474, 492, 493, 494

[56] References Cited

U.S. PATENT DOCUMENTS

| | | | |
|---|---|---|---|
| 3,038,523 | 6/1962 | Merck | 156/149 |
| 3,721,271 | 3/1973 | Chudgar | 156/149 |
| 3,988,189 | 10/1976 | Sullivan | 156/149 |
| 4,048,362 | 9/1977 | Moring et al. | 138/126 |
| 4,104,098 | 8/1978 | Hush et al. | 156/149 |
| 4,121,962 | 10/1978 | Hopkins | 156/149 |

*Primary Examiner*—Caleb Weston
*Attorney, Agent, or Firm*—Stevens, Davis, Miller & Mosher

[57] ABSTRACT

A reinforced tubular article such as a hose is manufactured by at least partially vulcanizing a rubber composition to form an inner tube and forming on the outer surface of said inner tube an assembly of reinforcing members which are united with the inner tube by a solidifiable liquid polymer material which when solidified bonds to both the reinforcing members and the outer surface of the tube.

21 Claims, 3 Drawing Figures

METHOD OF MAKING REINFORCED TUBULAR ARTICLES

This is a continuation of application Ser. No. 942,038 filed Sept. 13, 1978 now abandoned.

This invention relates to reinforced tubular articles and in particular, though not exclusively, to an improved method for the manufacture of reinforced tubular articles, such as hose.

One common method for the manufacture of long length hose is to form a lining layer by extruding unvulcanised rubber onto a nylon building mandrel, wrapping layers of reinforcing cords around the lining layer, and subsequently extruding a further layer of rubber to form a cover layer for the hose. The assembly so formed is then encased in a lead sheath which when subject to the action of heat in an autoclave co-operates with the mandrel radially to compress the hose wall and consolidate its constituent layers whilst the rubber is vulcanised.

This method is time consuming, requires the use of much thermal energy, and presents health and safety hazards. In addition the associated apparatus is expensive and cumbersome, and the present invention seeks to provide an improved hose, or other tubular article, and method of manufacture thereof.

In accordance with one aspect of the present invention a method of manufacture of a reinforced tubular article comprises at least partially vulcanising a rubber composition to form an inner tube and forming on the outer surface of said inner tube an assembly of reinforcing members which are united with the inner tube by a solidifiable liquid polymer material which when solidified bonds to both the reinforcing members and outer surface of the tube.

Preferably the reinforcing members are embedded in and surrounded by the solidifiable liquid polymer material.

The assembly of reinforcing members may be embedded in or brought into contact with the solidifiable liquid polymer material for example by applying a coating of the solidifiable material to the tube and subsequently applying reinforcing members to the coated surface of the tube, or by applying to the tube reinforcing members which have been pre-dipped in the solidifiable liquid polymer material.

In contrast to the use of pre-dipped reinforcement members, the method of applying the reinforcing members to a tube surface treated with a solidifiable liquid polymer material is believed to be more efficient as a production method, and in this case where any interstices exist between neighbouring reinforcing members the reinforcing members should be applied at a tension which causes penetration of the liquid polymer material into said interstices without causing any substantial deformation to the inner tube.

Preferably the vulcanisation or partial vulcanisation of the inner tube renders the tube substantially self supporting such that it retains its cross-sectional shape without the use of a solid or rigid mandrel during formation of the assembly of reinforcing members. However, particularly if the tube wall thickness is small in relation to the overall cross-sectional dimensions of tube, the tube may be pressurised internally during formation of the assembly of reinforcing members to maintain the cross-sectional shape of the tube.

The reinforcing members may be formed for example of strips, cords, yarns, strands, or filaments, and may in particular comprise a group of lightly twisted or substantially untwisted filaments. The material of the reinforcing members may be a textile such as rayon, polyester, or nylon, or an aromatic polyamide such as Kevlar (ex Du Pont), or glass, or a metallic material such as steel strip or wire.

The reinforcing members may be applied to extend parallel or helically relative to the longitudinal axis of the inner tube and may be, for example, woven, knitted, or braided.

Subsequent to forming of the assembly of reinforcing members around the inner tube a cover layer of polymeric material may be formed around the reinforcing members for example by extrusion or wrapping of the polymeric material. To ensure that the adhesion required between the cover layer and the reinforcing members is adequate the assembly of reinforcing members should be coated with the liquid polymer material unless there is already present at the outer surface of the assembly a sufficient excess of the liquid polymer material provided to unite the reinforcing members and inner tube. Surprisingly it has been found that, especially in the case where the solidifiable liquid polymer material is a pvc (polyvinyl chloride) plastisol, the cover layer may be applied whilst the solidifiable material is still in a liquid condition, though alternatively the solidifiable material may first be treated to cause it to solidify. One suitable form of the material for the cover layer is a plastisol, and this may be either the same as that which unites the reinforcing members and inner tube, or for example a specially formulated or pigmented material having selected physical properties or colour. To assist in achieving good cover adhesion where the solidified polymer material embeds the reinforcing members, the solidified polymer material may first be heated to an appropriate temperature or alternatively treated with a solvent or a solution comprising pvc, cyclohexanone and methylethyl ketone.

Another suitable material for the cover layer is a thermoplastic polyurethane, such as Daltomold 238 (ex I.C.I.), and this is found to provide excellent adhesion to the solidifiable liquid polymer material at least where the latter is a pvc plastisol containing resorcinol and hexamethylene tetramine.

In the case of a tubular article in the form of a hose, the inner tube referred to above may constitute a lining of the finished hose or may be an inner layer underlying the reinforcement members and surrounding a tube of lining layer material.

From the foregoing it will be appreciated accordingly that the present invention envisages the manufacture of hoses or other tubular articles having lining or inner layers which are of an at least partially vulcanised rubber composition, and where a cover layer is provided this may be of either a rubber composition or a plastics material.

In accordance with a further of its aspects the present invention provides a reinforced tubular article made in accordance with the method of the invention, and a tubular article comprising an inner tube of an at least partially vulcanised rubber composition surrounded by a reinforcement structure comprising reinforcement members united with the inner tube by a solidified polymer material.

The rubber composition preferably comprises an unsaturated rubber containing in excess of 5 unsaturated bonds for every 100 main chain carbon atoms and more preferably in excess of 15 unsaturated bonds for every 100 main chain carbon atoms. Preferably the rubber composition is based upon a non-polar rubber e.g. natural rubber, styrene/butadiene rubber, but may be based on a polar rubber e.g. polychloroprene and may be based on blends of any of these. The rubber composition may contain conventional additives (e.g. fillers) or processing agents. The rubber composition may be sulphur-vulcanised or vulcanised with any other conventional vulcanising system.

To assist in providing a satisfactory bond between the solidifiable liquid polymer material and the inner tube the outer surface of the inner tube may be provided with a treatment agent prior to vulcanisation.

Suitable treatment agents which can be used to treat the inner tube include those which will halogenate and/or oxidise the rubber surface e.g. a chemical reagent or irradiation such as U.V. or corona discharge. Suitable examples of chemical reagents include trichloroisocyanuric acid (available as Fi-clor 91 from Fisons), sodium dichloroisocyanurate (available as Fi-clor 60s from Fisons) acidified inorganic hypohalites (e.g. acidified sodium hypochlorite), alkyl hypohalites (e.g. butyl hypochlorite), sodium chlorite and peracetic acid. Preferably the treatment agent when a chemical reagent is applied non-aqueously, e.g. as a solution in an organic solvent such as ethyl acetate or acetone, by any conventional means, for example by dipping, spraying or brushing.

The solidifiable liquid polymer material preferably is based upon a polar polymer which contains at least one type of polar group e.g. selected from —Cl, —NH$_2$,

—C≡N,

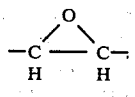

and —OH, and which preferably has a solubility parameter of greater than 9 (cals/cc)$^{\frac{1}{2}}$, more preferably greater than 9.5 (cals/cc)$^{\frac{1}{2}}$. Solubility parameter is referred to on page 834 of volume 3 of the Encyclopaedia of Polymer Science and Technology—John Wiley & Sons). By 'solubility parameter' is meant the square root of the cohesive energy density and indicates the magnitude of intermolecular forces within the polymer. Examples of suitable materials include a vinyl chloride polymer e.g. in plastisol form, an aliphatic polyamide, a polyurethane, a poly(vinyl acetate) an ethylene/vinyl acetate copolymer, and a rubber which may be e.g. in latex form e.g. nitrile rubber or carboxylated nitrile rubber.

It is to be understood that the term "vinyl chloride polymer" embraces poly(vinyl chloride) and copolymers of vinyl chloride with one or more other monomers. Suitable other monomers are e.g. vinyl esters and alkyl acrylates. Copolymers should preferably have a vinyl chloride unit content of at least 50 weight percent. Examples of suitable copolymers include copolymers of vinyl chloride with vinylacetate or methyl acrylate, with or without a further monomer.

The solidifiable liquid polymer material may be applied e.g. as a solution, a dispersion (e.g. in a plasticiser), a latex or as two liquid components which react to form a solid polymer. Preferably the material is applied as a liquid to the rubber composition and then heated to such a temperature that on cooling it solidifies. If desired, a further coating of the material may be applied after solidification of the first.

Preferably the solidifiable liquid polymer material includes ingredients which form a resin such as a condensed aldehyde resin. Examples of suitable aldehyde condensation resin-forming ingredients are an aromatic hydroxy compound, especially one having two hydroxyl groups meta to each other such as resorcinol, phloroglucinol or 1,3-dihydroxynaphthalene, and a compound which liberates methylene groups on heating such as hexamethylene tetramine, hexamethoxymethyl melamine, lauryloxymethyl pyridinium chloride, cetyloxymethyl pyridinium chloride or a polymer of formaldehyde. Alternatively a partially or fully condensed resin such as a condensed aldehyde resin may be included in the solidifiable liquid polymer material and examples of these are melamine and urea-formaldehyde resins. When resin-forming ingredients or a partially or fully condensed resin is included in the polymer material it may be desirable to include also an epoxy resin or an isocyanate in the polymer material. This extra ingredient may reduce the potential porosity of the solidified polymer material.

The resin-forming ingredients or partially condensed resin or fully condensed resin is/are preferably present in a total amount in the range of from 3.2 to 12 parts by weight based on 100 parts dry weight of the polymer material. If resin-forming ingredients are used such as an aromatic hydroxy compound and a compound which liberates methylene groups on heating these are preferably present in an amount in the range of from 2 to 7.5 parts by weight and 1.2 to 4.5 parts by weight respectively based on 100 parts by dry weight of the polymer material.

Where the solidifiable liquid polymer material or any cover layer is of a liquid which reacts to form a polyurethane, the liquid may be restrained from spontaneous setting on mixing of its components by any well known method known to those skilled in the art e.g. incorporation of a stabilising agent such as sodium chloride in the diamine component of the liquid or by reaction of a blocked isocyanate with a phenolic reagent. The stabilising agent is found to inhibit reaction of the liquid to form the polyurethane until heated above a certain temperature and thus such material can conveniently be coated on a part-formed hose.

Two embodiments of the invention will now be described, by way of example, with reference to the accompanying drawings in which.

Figure 1:
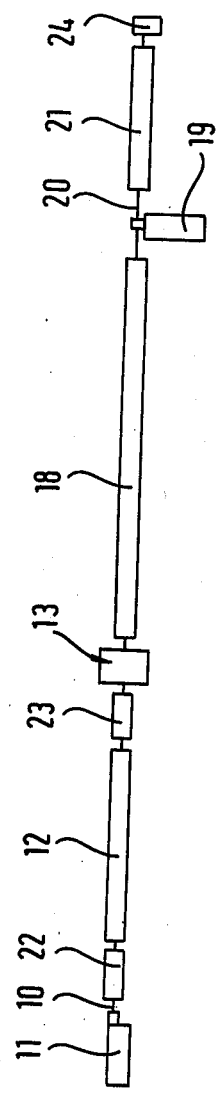
FIG. 1 shows schematically apparatus for use in one method in accordance with the present invention.

An inner tube 10 of styrene/butadiene rubber, for forming the lining layer of a 10 mm bore hose, is extruded from extruder 11. The wall thickness of the tube is 2 mm.

On emerging from the extruder the outer surface of the tube is treated, prior to vulcanisation, by spraying at unit 22 with an acetone or ethyl acetate solution containing 1% of trichloroisocyanuric acid such as is available as Fi-clor 91 (ex Fisons) having the formula:

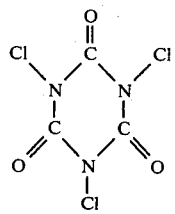

The surface-treated tube 10 is then passed through a fluidised bed 12 to effect vulcanisation of the tube. To assist in achieving a uniform vulcanisation of the tube material around the circumference thereof, infra-red heaters (not shown) are provided above the surface of the fluidised bed to ensure full vulcanisation of that part of the tube above and/or nearest the surface of the fluidised bed.

Treatment of the tube prior to vulcanisation is found surprisingly to inhibit tackiness of the tube surface with the result that on passing through a fluidised bed virtually none of the fluidised particles become adhered to the surface of the tube.

Figure 2:
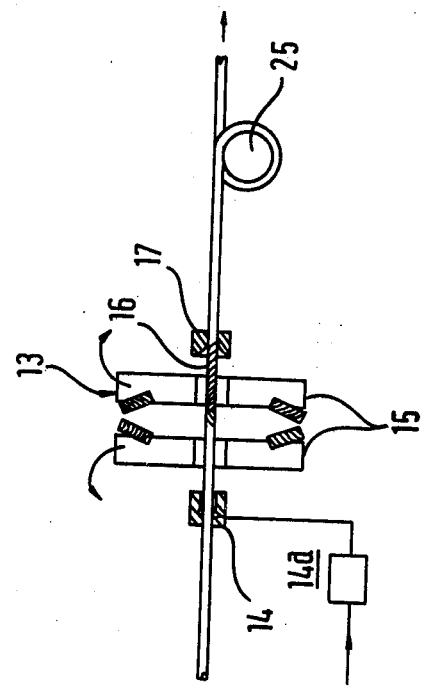
FIG. 2 shows schematically in detail a part of the apparatus of FIG. 1.

Accordingly, without any need for more than possibly a minimal cleansing of the outer surface of the tube at station 23, the tube is fed directly to a composite reinforcement structure applicator unit 13 (see FIG. 2). The applicator unit 13 comprises a die 14 at which pvc plastisol is applied, via pump 14a, as a thin coating around the cooled tube 10, and two carousels 15 which are rotatable in opposite directions to form around the plastisol treated tube a pair of reinforcement layers 16 of helically extending nylon cords. The die 14 is water coold to counteract the heating effect of the plastisol passing therethrough and thus ensure that throughout use of the die the applied plastisol is of a substantially uniform viscosity. The exit of the applicator unit 13 is provided with a smoothing die 17 which gently consolidates the reinforcing cords and plastisol so that the plastisol infiltrates into the interstices between the cords, and filaments of the cords, the die also giving a smooth external finish to the hose assembly emerging therefrom.

The hose assembly travels around a haul-off capstan 25 and is then passed through a heated chamber 18 where the combination of heat supplied by the chamber and that in the freshly vulcanised lining tube 10 effects solidification of the pvc plastisol.

Subsequently the hose assembly passes through an extruder 19 which applies to the assembly a pvc cover layer 20 of a thickness of approximately 2 mm. The hose then travels through a cooling bath 21 before being coiled on a drum 24. A capstan (not shown) is located at the exit of the cooling bath to assist in smoothly drawing the extruded inner tube from the extruder through the line of apparatus.

In the above described process vulcanisation of the lining tube 10 is effected in a fluidised bed which, by virtue of the gentle floatation which it provides, assists in preserving without any significant distortion the circular cross-section of the vulcanised extruded tube. Maintenance of the circular cross-section may also be assisted by a small air pressure maintained in the vulcanised inner tube via a passage (not shown) in the extruder 11. Alternatively, however, vulcanisation may be effected by other known means such as microwave heating or use of hot air chambers.

In the above described process there is described treating the vulcanised hose with a treatment agent to ensure a good bond with the pvc plastisol. The treatment also serves to resist any tendency for the fluid bed particles to adhere to the outer surface of the tube 10, but particularly where an alternative means is employed to effect vulcanisation a different treatment, if necessary, may be used to ensure a good bond with the subsequently applied plastisol.

Thus, for example, the vulcanised inner tube 10 may be treated with a dilute acidified sodium hypochlorite solution before having the plastisol applied thereto. The use of this solution is found to be particularly suitable where the inner tube is of styrene/butadiene rubber.

In general, however, it is preferred to effect any necessary treatment of the inner tube surface before vulcanisation because the vulcanisation stage can contaminate the tube surface and render it less receptive to treatment.

Apart from halogenation and/or oxidation, other treatments such as the application of Chemlok 220 (ex Hughson Corporation) or dispersions of carbon black may be used to obtain an adequate bond.

In the above described method the hose is built by horizontal movement of the inner tube 10, but if space permits advantages may be gained by a vertical, preferably upwards movement of the extruded tube. In a vertical operation the fluids applied to the tube, e.g. treatment agent or plastisol, will not tend to run circumferentially around the tube and a more uniform coating thickness can be achieved.

Figure 3:
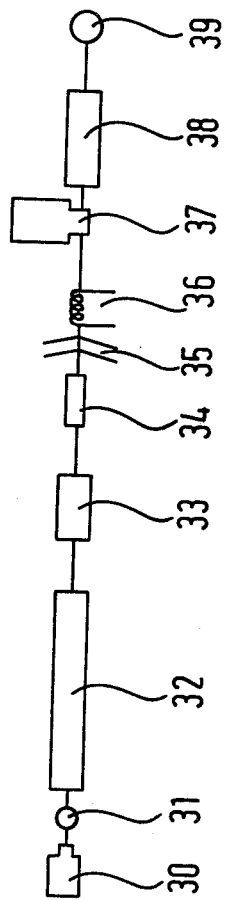
FIG. 3 shows schematically apparatus for use in another method in accordance with the present invention.

In a second embodiment of the present invention, illustrated with reference to FIG. 3, an unvulcanised hose inner tube is formed by an extruder 30, surface treated with a treatment agent at applicator 31, and vulcanised in a fluidised bed 32 substantially in the same manner as described in respect of the first embodiment of the invention.

However, before application of pvc plastisol to the outer surface of the tube the outer surface is cooled. This is achieved by passing the inner tube through chamber 33 where it is sprayed with liquid nitrogen. The thus cooled surface of the inner tube is then coated with pvc plastisol by the plastisol applicator 34 positioned substantially adjacent the chamber 33. The plastisol treated tube then passes through a spiralling unit 35 which winds around the hose in opposite senses two layers of reinforcement cords, and after passage through an infra-red heater 36 the part-formed hose assembly is covered, cooled, and batched-up substantially as described in respect of the first embodiment of the invention.

In the above described method cooling of the inner tube surface with liquid nitrogen temporarily produces a very steep temperature gradient in the tube wall and this inhibits initial gelling of the plastisol until the reinforcing members have been applied and become embedded. However, subsequent to spiralling of the reinforcement members the heat contained in the tube conducts to the tube outer surface to assist gelling of the pvc plastisol and the inra-red heater 36 serves to supply any additional heat needed to complete the gelling. Extruder 37 applies a cover layer and the hose assembly so formed is then cooled in chamber 38 and coiled at unit 39.

Whilst the invention has been described above specifically in relation to a method in which all operations are performed sequentially in an in-line manner, the invention may be applied also to the manufacture of hose, or other reinforced tubular articles, in a step-wise manner, comprising two or more stages which may be spaced by a substantial time interval. Thus, for example, in the first stage of a modified method of hose manufacture an inner tube of at least partially vulcanised rubber is formed and coated with pvc plastisol substantially as described in respect of the first embodiment of the invention and the pvc plastisol caused to solidify. The assembly so formed may then be stored until required to complete the formation of the reinforced tubular article in a second stage of the operation. In the second stage an additional coating of pvc plastisol is applied to the plastisol coated inner tube, reinforcing filaments wound to form a reinforcement structure, and the subsequent operations as described in respect of the first embodiment then performed to complete the hose manufacture.

By dividing the overall method in the above manner the bond strength between the reinforcement structure and inner tube is not adversely affected to any significant degree compared with the bond strength obtained in a single in-line operation. The solidified pvc plastisol is securely bonded to the inner tube whilst the latter has a fresh uncontaminated outer surface, and the solidified plastisol provides a surface to which the additional pvc plastisol will readily adhere.

In contrast to the conventional method of hose manufacture in which the plastic flow of soft uncured rubber in a substantially solid phase is relied on to fill any interstices between reinforcing members, the present invention utilises the flow of solidifiable liquid polymer to fill any interstices. Since the liquid polymer flows more readily than soft rubber there is achieved a superior embedding of the reinforcing members, and furthermore with virtually no flow of the inner tube material or movement of the reinforcing members a more reliable product of consistent quality is achieved.

By eliminating the need to use a building mandrel and lead sheathing equipment the invention also provides a process which is quicker, safer, and less energy consuming. During vulcanisation of the inner tube and solidifying of the liquid polymer there is no essential requirement to heat and subsequently cool any mandrel.

In addition to the manufacture of flexible hose the invention may be applied to other tubular articles such as reinforced pipes and cylindrical or conical-like structures used for forming air suspension diaphragms.

Having now described our invention—what we claim is:

1. A method for the manufacture of a reinforced tubular article having an inner lining tube of vulcanised rubber comprising:
    forming an inner tube of vulcanisable rubber composition,
    applying to the outer surface of the inner tube an agent which will halogenate said surface, then passing said inner tube through a fluidised bed vulcaniser to effect vulcanisation of the inner tube and render said tube substantially self-supporting, and
    forming on the outer surface of said inner tube an assembly of reinforcing members which are united with the inner tube by solidifiable liquid polymer material which when solidified bonds to both the reinforcing members and the outer surface of the inner tube.

2. A method according to claim 1 wherein a coating of solidifiable liquid polymer material is applied to the inner tube before the application of the reinforcing members.

3. A method according to claim 1 wherein the reinforcing members are applied under tension to cause penetration of the solidifiable liquid polymer material into any interstices between neighbouring reinforcing members.

4. A method according to claim 1 wherein the reinforcing members are embedded in and surrounded by the solidifiable liquid polymer material.

5. A method according to claim 4 wherein the reinforcing members are dipped in a solidifiable liquid polymer material before being applied around the inner tube.

6. A method according to claim 1 wherein a cover layer of polymeric material is formed around the assembly of reinforcing members.

7. A method according to claim 6 wherein the cover layer is applied whilst the solidifiable liquid polymer material is in a liquid condition.

8. A method according to claim 3 wherein the solidifiable liquid polymer material is allowed to solidify and embed the reinforcing members, and then treated with a solvent or solution to assist adhesion to a subsequently applied cover layer.

9. A method according to claim 3 wherein the solidifiable liquid polymer material is allowed to solidify and embed the reinforcing members, and then heated to assist adhesion to a subsequently applied cover layer.

10. The method according to claim 1, wherein the solidifiable liquid polymer material is a polyurethane plastisol.

11. The method according to claim 1, wherein the solidifiable liquid polymer material contains resin-forming ingredients.

12. A method according to claim 11 wherein the solidifiable liquid polymer material is a polyvinyl chloride plastisol.

13. A method according to claim 1 wherein the solidifiable liquid polymer material is formed around the inner tube before the inner tube has fully cooled to ambient temperature subsequent to said at least partial vulcanisation.

14. A method according to claim 13 wherein the surface of the inner tube is cooled before application of the solidifiable liquid polymer material.

15. A method according to claim 1 wherein heating means is provided at least to assist in solidifying the solidifiable liquid polymer system.

16. A method according to claim 1 wherein the inner tube is pressurised internally during formation of the assembly of reinforcing members.

17. A method according to claim 1 wherein the inner tube is pressurised internally during said vulcanisation.

18. A method according to claim 1 comprising forming on the outer surface of the inner tube a solidified coating of polymer material which bonds to the inner tube, and forming around said coating the assembly of reinforcing members which are united with the inner tube by solidifiable liquid polymer material which when solidified bonds to the reinforcing members and said solidified coating.

19. A method for the continuous manufacture of a reinforced tubular article having an inner lining tube of vulcanised rubber and an outer cover of thermoplastics material comprising:

extruding a vulcanisable rubber composition to form an inner tube, applying to the outer surface of the inner tube a treatment agent which will halogenate said surface, passing the surface treated inner tube through a fluidised bed vulcaniser to effect vulcanisation of the inner tube and render said tube substantially self-supporting, forming around the inner tube an assembly of reinforcing members and a solidifiable liquid polymer material which when solidified unites the reinforcing members with the inner tube, and forming by extrusion around said assembly a cover layer of thermoplastics material.

20. A method for the continuous manufacture of a reinforced tubular article having an inner lining tube of vulcanised rubber and an outer cover of thermoplastics material comprising:

extruding a vulcanisable rubber composition to form an inner tube, applying to the outer surface of the inner tube a treatment agent which will halogenate said surface, passing the surface treated inner tube through a fluidised bed vulcaniser to effect vulcanisation of the inner tube and render said tube substantially self-supporting, forming on the outer surface of the inner tube a solidified coating of polymer material which bonds to the inner tube, forming around said coating an assembly of reinforcing members which are united with the inner tube by solidifiable liquid polymer material which when solidified bonds to the reinforcing members and said solidified coating, and forming by extrusion around said assembly a cover layer of thermoplastics material.

21. The method according to claim 20, wherein the solidifiable liquid polymer material is solidified by the application of heat, said heat also softening the material of the solidified coating to assist adhesion thereto of the solidifiable material when solidified.

\* \* \* \* \*